UNITED STATES PATENT OFFICE.

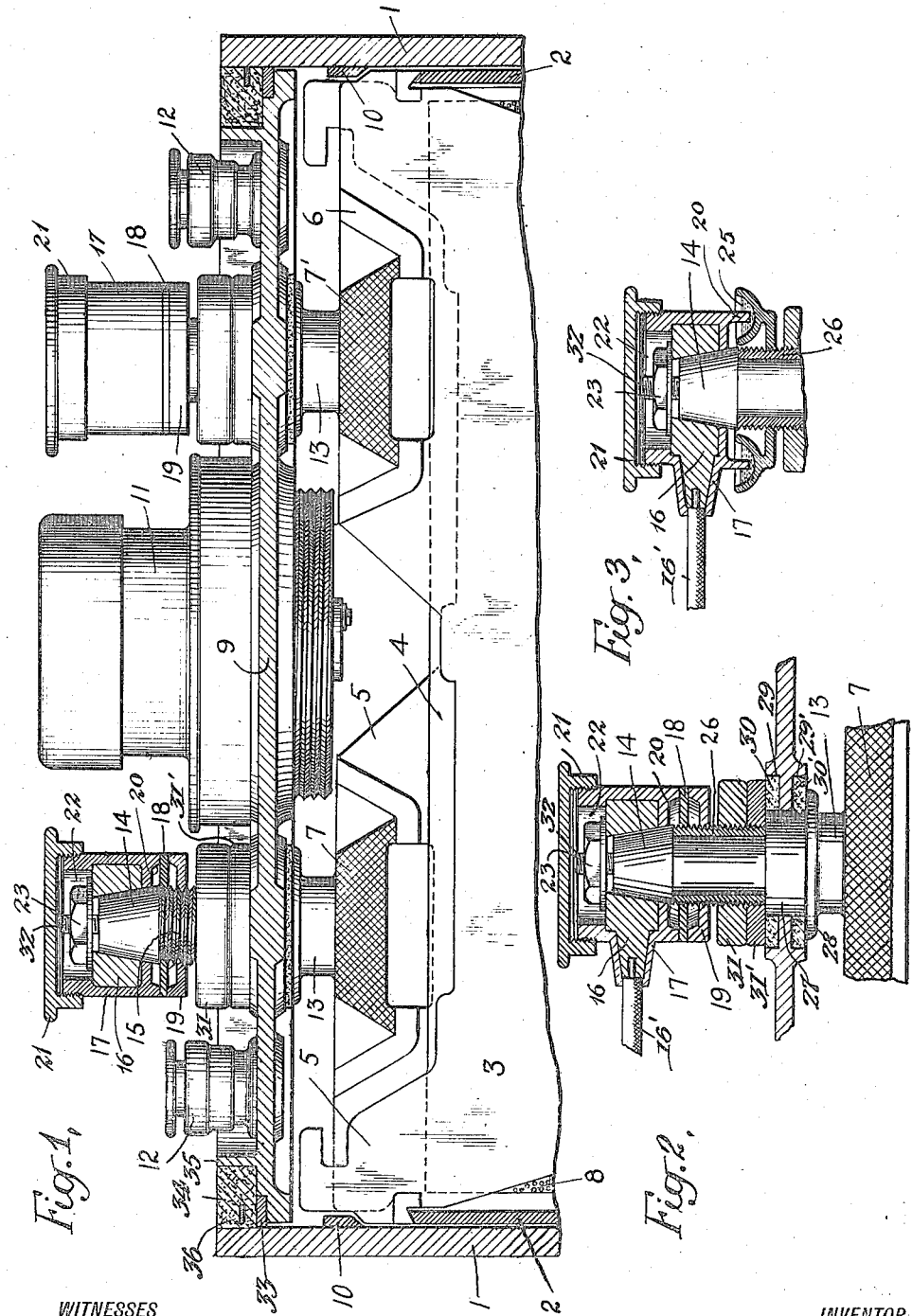

ALMOND H. SNYDER, OF LANCASTER, NEW YORK, ASSIGNOR TO GOULD STORAGE BATTERY COMPANY, A CORPORATION OF NEW YORK.

TERMINAL CONNECTION.

1,127,935.  Specification of Letters Patent.  Patented Feb. 9, 1915.

Original application filed August 15, 1912, Serial No. 715,147. Divided and this application filed October 24, 1913. Serial No. 796,993.

*To all whom it may concern:*

Be it known that I, ALMOND H. SNYDER, a citizen of the United States, and a resident of Lancaster, in the county of Erie and State of New York, have invented a new and useful Improvement in Terminal Connections, of which the following is a specification.

My invention relates to terminal connections, and the invention is particularly applicable to terminal connections for storage batteries.

This application is a division of my co-pending application, Serial No. 715,147, filed August 15, 1912, for improvements in storage batteries.

The main object of the invention is to provide a durable and efficient terminal connection in which the corrodible metallic engaging or connecting parts are thoroughly protected from corrosive liquids or vapors.

Further features and advantages of the invention will more fully appear from the following description taken in connection with the accompanying drawings forming a part of this specification, in which—

Figure 1 is a vertical sectional view of a storage battery cell provided with terminal connections embodying the preferred form of my invention; Fig. 2 is a vertical sectional view of the terminal connections taken at right angles to the section of Fig. 1; and Fig. 3 shows a similar view of a modification.

Referring to the drawings, 1 represents a hard rubber battery jar provided at its sides with glass plates 2 for supporting the positive and negative battery plates 3 and 4. The plates are each provided with upwardly extending lugs 5 and 6, the lugs 5 and 6 being lead burned to negative and positive bus bars 7, 7', respectively. Between the positive and negative plates 3 and 4 are placed suitably supported separating strips 8. The cell or jar is closed by a cover 9 and the positive and negative plates 3 and 4 are held spaced apart at the points where they are supported by the glass plate 2 by rubber separating strips 10. The center of the cover 9 is provided with a suitable ventilating outlet duct 11 and the cover is also provided with two ventilating inlet ducts 12 located near the ends of the cell.

From each of the negative and positive bus bars 7, 7' terminals 13 extend. Each terminal extends up through the cover 9 and is provided at its top with a tapered portion 14 and a lower screw-threaded portion 15. Each terminal consists of a copper or brass conductor which, below its tapering or connecting portion 14, is provided with a thick coating 26 of some suitable non-corrodible compound, preferably a non-corrodible metal alloy as, for example, an alloy of lead and antimony. This coating is molded upon and made a part of the conductor, and the threads are molded in the coating at the time and subsequently cut true. This coating of alloy on the shank of the terminal is in some instances as much as $\frac{1}{4}$ to $\frac{5}{16}$ of an inch thick and thoroughly protects the inner or corrodible portion of the terminal.

Each terminal below the threaded portion 15 is provided with a smooth portion 27, of larger diameter than the threaded portion, and below the smooth portion the terminal is provided with a flange 28. The cover 9 is provided with annular recesses 29 and 29' in its upper and lower surfaces, arranged concentric with the terminal, and these recesses are provided with washers 30 and 30' of suitable material, such as fiber or hard rubber. The lower washer 30' rests upon the flange 28 of the terminal, which, in this manner supports the cover 9, and the cover with its washers are held firmly upon the flange 28 by means of suitable lock-nuts 31, 31', threaded onto the threaded portion 15 of the terminal.

Each terminal is fitted above the tapered portion 14 with a connection piece 16 of copper or some other good electrical conductor having a connecting wire 16' soldered thereto. A molded protective covering 17 of lead alloy surrounds the connecting portions of the terminal and the connection piece 16 to prevent corrosion of the same. A gasket 18 fits on the terminal below the connecting portion and a nut or screw-threaded member 19 works on the screw threads on the terminal to engage the gasket and force it into engagement with a depending flange 20 surrounding the terminal, preferably integral with the protective covering or shell 17, so that a tight joint is formed between the gasket and the adjacent portion of the covering. A removable cap piece 21 is screw-threaded on the protective covering so as to form an inclosed chamber 22 for the tapered portion of the terminal 14, the connection piece 18 and a suitable securing nut 23 which is threaded onto a stud 32 projecting from the top of the terminal. The tapering connecting portion of the terminal projects up through the lower opening in the protective covering and through the tapering opening in the connection piece 16, the latter being held firmly down on the terminal by the nut 23. By this arrangement the engaging or connecting portions of the terminal and the connecting piece, together with the clamping nut, all of which are preferably formed of copper, are thoroughly protected within the chamber formed by the protective covering or shell 17 and the cap 21, which contain no flush joints through which corrosive liquids or vapors may leak.

Referring to Fig. 3, the terminal connection there shown is modified in that, instead of being provided with a gasket 18, a liquid seal 25 is provided for the bottom of the protective covering or shell 17 so as to prevent the corrosive gases or liquids from reaching the connecting portions of the terminal. The liquid used for this liquid seal may be water or any other suitable liquid. It is preferable to use some neutral or substantially neutral liquid which will not of itself attack the terminal if split within the jacket, and which will neutralize or weaken any acid fumes or liquid which comes in contact therewith.

The cover is sealed to the jar in any suitable manner, such as by providing a flexible strip 33, extending around the edge of the cover in engagement with the sides of the jar, and upon which is poured a suitable sealing compound 34, such as an asphaltum compound, which is held in position between the sides of the jar and a vertical flange 35, extending around the cover. In order to facilitate the unsealing of the jar, I provide a conductor 36 embedded in the sealing compound 34, which may be heated to melt the compound by connecting the ends of the conductor to the battery, or otherwise connecting it with a suitable source. This feature of sealing the cover to the jar forms no part of my present invention, but is claimed in my co-pending application for storage battery cells, Serial No. 796,994, filed October 24, 1913.

Having thus described my invention, what I claim as new and desire to secure by Letters Patent, is:—

1. In a storage battery, the combination of a terminal, a connection piece fitting the same, a protective covering surrounding the connecting portions of the terminal and connection piece, a gasket fitting on one of the connecting pieces, and means on the connecting piece having the gasket, adapted to engage the gasket and force it into engagement with the adjacent portion of the protective covering to form a tight joint.

2. In a storage battery, the combination of a terminal, a connection piece fitting the same, a molded protective covering surrounding the connecting portions of the terminal and connection piece, a gasket fitting on one of the connecting pieces, means on the connecting piece having the gasket, adapted to engage the gasket and force it into engagement with the adjacent portion of the molded protective covering to form a tight joint, and a removable cap piece on the covering.

3. In a storage battery, the combination of a terminal, a connection piece fitting the same, a molded protective covering surrounding the connecting portions of the terminal and connection piece, and means fitted on the terminal below said connection piece and adjustable vertically thereupon and having means operatively related to a portion of the protective covering to form therewith a joint that will exclude corrosive fluids.

4. In a storage battery the combination of a horizontal bus bar having one or more battery plates connected thereto, a terminal secured to and extending upwardly from said bus bar and having a connecting portion, a connection piece fitting said connecting portion, a protective covering surrounding the connecting portions of the terminal and connection piece, and means fitted on the terminal below said connection piece and adjustable thereupon and operatively related to a portion of the protective covering to form therewith a joint that will exclude corrosive fluids.

5. In a storage battery the combination of a horizontal bus bar having one or more battery plates connected thereto, a terminal secured to and extending upwardly from said bus bar and having a connecting portion and a threaded portion below said connecting portion, a connection piece fitting said connecting portion, a protective covering surrounding the connecting portions of the terminal and connection piece, and means threaded on said threaded portion of the terminal below the connection piece so as to be adjustable thereupon and operatively related to a portion of the protective covering to form therewith a joint that will exclude corrosive fluids.

6. In a storage battery, the combination of a terminal having a connecting portion and a threaded portion below the same, a connection piece fitting the connecting portion of the terminal, a protective covering surrounding the connecting portions of the terminal and connection piece and having a depending flange, and means fitting the threaded portion of the terminal below the connection piece and forming with the flange a joint that will exclude corrosive fluids.

7. In a storage battery, the combination of a terminal having a connecting portion and a threaded portion below the same, a connection piece fitting the connecting portion of the terminal, a protective covering surrounding the connecting portions of the terminal and connection piece and having an opening above the terminal, a removable cap piece fitting the opening, a depending flange from the covering surrounding the terminal, a gasket fitting around the terminal below the connecting portion, and a nut fitting the threaded portion of the terminal below the gasket and adapted to engage the gasket and force it into engagement with the adjacent portion of the protective covering to form a tight joint.

8. In a storage battery, the combination of a terminal, a connection piece fitting the same, a protective covering surrounding the connecting portions of the terminal and connection piece, a gasket fitting around the terminal below the connecting portion, and means on the terminal below the gasket adapted to engage the gasket and force it into engagement with the adjacent portion of the protective covering to form a tight joint between the gasket and the adjacent portion of the covering.

9. In a storage battery, the combination of a terminal having a connecting portion and a threaded portion below the same, a connection piece fitting the connecting portion of the terminal, a protective covering surrounding the connecting portions of the terminal and connection piece and having a depending flange surrounding the terminal, a gasket fitting around the terminal below the connecting portion, and a nut fitting the threaded portion of the terminal below the gasket and adapted to engage the gasket and force it into engagement with the adjacent portion of the protective covering to form a tight joint.

10. In a storage battery, the combination of a terminal, a connection piece fitting the same, a molded protective covering surrounding the connecting portions of the terminal and connection piece to prevent corrosion of the same, said protective covering being removable from the terminal and having an opening therein, and a removable cap fitting the opening.

11. In a storage battery, the combination of a terminal, a connection piece fitting the same, a protective covering molded on said connection piece and having an opening at one end, and a cap piece for closing said opening detachably secured to said protective covering.

12. In a storage battery the combination of a terminal having a connecting portion, a connection piece fitting said connecting portion of the terminal, securing means for holding said connection piece firmly in contact with the connecting portion of the terminal, a protective covering on said connection piece and having an opening at one end, and a cap piece for closing said opening detachably secured to said protective covering and therewith inclosing said securing means.

13. In a storage battery, the combination of a terminal, a connection piece having an opening therein fitting over the terminal, a protective covering molded on the connection piece and having an open top portion, a detachable cap piece fitting said opening, a gasket on the terminal below the connection piece, and means on the terminal below the gasket for forcing the same into engagement with the adjacent portion of the protective covering of the connection piece to form a tight joint therewith.

14. In a storage battery, the combination of a terminal, a connection piece having an opening therein fitting over the terminal, a protective covering molded on the connection piece and having an open top portion, a detachable cap piece covering said opening, a depending flange from the protective covering surrounding the terminal, a gasket on the terminal below the flange, and a nut threaded on the terminal below the gasket and adapted to force the gasket into engagement with the depending flange to form a tight joint therebetween.

15. In a storage battery, the combination of a terminal, a connection piece having an opening therein fitting over the terminal, a protective covering molded on the connection piece and having an open top portion, a detachable cap piece closing said opening, a depending flange from the protective covering surrounding the terminal, and means fitting the terminal below the flange and forming with the flange a tight joint.

16. In a storage battery, the combination of a terminal having a tapering connecting portion, a connection piece having a tapering opening fitting the taper of the terminal, a nut securing the connection piece on the terminal, a protective covering molded on the connection piece and having an open top portion, and a detachable cap closing said opening in the protective covering and with the protective covering inclosing said nut.

17. In a storage battery, the combination of a terminal having a tapering connecting portion, a connection piece having a tapering opening fitting the taper of the terminal, a nut securing the connection piece on the terminal, a protective covering molded on the connection piece and having an open top portion, a detachable cap closing said opening, a gasket on the terminal below the connection piece, and means on the terminal adapted to engage said gasket and force it into engagement with the adjacent portion of the protective covering.

18. In a storage battery, the combination of a terminal having a tapering connecting portion, a connection piece having a tapering opening fitting the taper of the terminal, a nut securing the connection piece on the terminal, a protective covering molded on the connection piece and having an open top portion, a detachable cap closing said opening, a flange depending from said protective covering and surrounding the terminal, a gasket on the terminal below the flange, and a nut on the terminal for engaging the gasket and forcing it into engagement with the flange to form a tight joint therebetween.

19. In a storage battery, the combination of a terminal having a tapering connecting portion, a connection piece having a tapering opening fitting the taper of the terminal, a nut securing the connection piece on the terminal, a protective covering molded on the connection piece and having an open top portion, a detachable cap closing said opening, a flange depending from said protective covering and surrounding the terminal, and means fitting the terminal below the flange and having a part operatively related to the flange to form therewith a joint that will exclude corrosive fluids.

20. In a storage battery the combination of a terminal having a connecting portion and a threaded portion below said connecting portion, a connection piece fitting said connecting portion of the terminal, a protective covering on said connection piece and open at one end, means threaded on the threaded portion of the terminal below the connecting portion thereof and adjustable thereon to form a joint with the protective covering to exclude corrosive fluids, and means on the terminal above the connection piece forming a tight joint therewith above the engaging surface of the connection piece and terminal.

21. In a storage battery the combination of a horizontal bus bar having a plurality of plates connected therewith, a terminal secured to said bus bar and extending upwardly therefrom and having a connecting portion and threaded portions above and below the same, a connection piece having an opening therein fitting the connecting portion of the terminal, a protective covering upon the connection piece open at the top, a nut threaded on the threaded portion above the connecting portion of the terminal to hold the connection piece in place upon the connecting portion of the terminal, a detachable cap piece closing the opening in the protective covering and forming therewith a protective covering for the nut, and means fitting the threaded portion of the terminal below the connecting portion thereof and adjustable thereon to form with the cover a joint to exclude corrosive fluids.

In testimony whereof, I have signed my name to this specification, in the presence of two subscribing witnesses.

ALMOND H. SNYDER.

Witnesses:
P. W. ENGLISH,
JOSEPH MURPHY.